United States Patent
Sullivan

(10) Patent No.: US 6,893,362 B2
(45) Date of Patent: *May 17, 2005

(54) MOLD AND METHOD OF MOLDING GOLF BALL HAVING DIMPLES ON THE EQUATOR

(75) Inventor: Michael J. Sullivan, Barrington, RI (US)

(73) Assignee: Acushnet Company, Fairhaven, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/340,117

(22) Filed: Jan. 10, 2003

(65) Prior Publication Data

US 2004/0138009 A1 Jul. 15, 2004

(51) Int. Cl.$^7$ ............................................. A63B 37/06
(52) U.S. Cl. ...................................................... 473/378
(58) Field of Search ................................. 473/378, 383, 473/384

(56) References Cited

U.S. PATENT DOCUMENTS

| | | | |
|---|---|---|---|
| 699,632 A | 5/1902 | Richards | |
| 4,389,365 A | * 6/1983 | Kudriavetz | ............... 264/297.8 |
| 4,653,758 A | 3/1987 | Solheim | ..................... 273/227 |
| 4,915,389 A | * 4/1990 | Ihara | ........................... 473/383 |
| 4,959,000 A | 9/1990 | Giza | ........................... 425/116 |
| 5,112,556 A | 5/1992 | Miller | ........................ 264/279 |
| 5,201,523 A | 4/1993 | Miller | ........................ 273/233 |
| 5,688,193 A | 11/1997 | Kasasima et al. | ............ 473/379 |
| 5,798,071 A | 8/1998 | Boehm | ....................... 264/275 |
| 5,827,135 A | 10/1998 | Shimosaka et al. | ......... 473/379 |
| 5,840,351 A | 11/1998 | Inoue et al. | ................. 425/556 |
| 5,902,193 A | 5/1999 | Shimosaka et al. | ......... 473/384 |
| 5,906,551 A | 5/1999 | Kasashima et al. | ......... 473/384 |
| 5,947,844 A | 9/1999 | Shimosaka et al. | ......... 473/379 |
| 6,123,534 A | 9/2000 | Kasashima et al. | ......... 425/116 |
| 6,168,407 B1 | 1/2001 | Kasashima et al. | ......... 425/116 |
| 6,200,232 B1 | 3/2001 | Kasashima et al. | ......... 473/384 |
| 6,290,615 B1 | 9/2001 | Ogg | ........................... 473/378 |
| 6,520,873 B2 | * 2/2003 | Inoue et al. | ................. 473/378 |

* cited by examiner

Primary Examiner—Raeann Gorden
(74) Attorney, Agent, or Firm—D. Michael Burns

(57) ABSTRACT

A method and mold for making a multi-parting line golf ball by compressing a dimple arrangement about a pre-formed sphere. The mold comprises at least three mold inserts having dimple producing projections on their inner spherical surfaces. Upon the dimples being molded to the pre-formed sphere, the resulting parting lines which are offset to the equator of the sphere, are visually inconspicuous, due to the pre-formed sphere being of a net size and weight very similar to the finished golf ball. The method of the invention allows for dimples to be located at and on the equator of the ball.

7 Claims, 2 Drawing Sheets

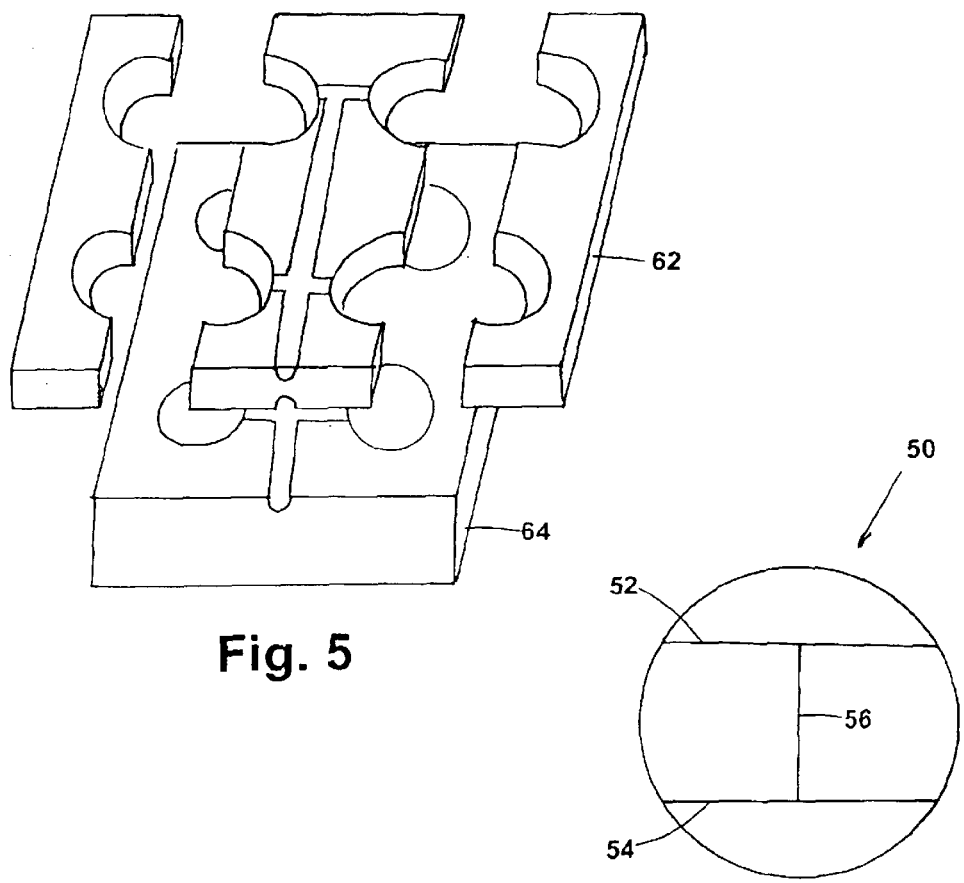
Fig. 5
Fig. 4
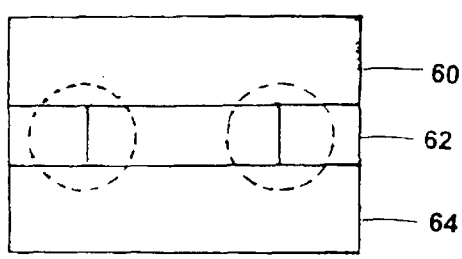
Fig. 6

MOLD AND METHOD OF MOLDING GOLF BALL HAVING DIMPLES ON THE EQUATOR

FIELD OF THE INVENTION

The invention relates to a method of manufacturing a golf ball without a visually conspicuous parting line. More specifically, the golf ball is formed by compression molding dimples upon a pre-form sphere.

BACKGROUND OF THE INVENTION

The usual golf ball manufacturing techniques include several different steps, depending on the type of ball, such as one, two, three or even more than three piece balls. According to the traditional method, a solid or composite elastomeric core is made, and an outer dimpled cover is formed around the core.

The two standard methods for molding a cover over a core or a core and inner layers is by compression molding or injection molding. The compression molding operation is accomplished by using a pair of hemispherical molds each of which has an array of protrusions machined or otherwise provided in its cavity, and those protrusions form the dimple pattern on the periphery of the golf ball during the cover molding operation. A pair of hemispherical cover blanks, are placed in a diametrically opposed position on the golf ball body, and the body with the cover blanks thereon are placed in the hemispherical molds, and then subjected to a molding operation. The combination of heat and pressure applied during the molding operation results in the cover blanks being fused to the golf ball body and to each other to form a unitary one-piece cover structure which encapsulates the golf ball body. In addition, the cover blanks are simultaneously molded into conformity with the interior configuration of the hemispherical molds which results in the formation of the dimple pattern on the periphery of the golf ball cover. The drawbacks are that half shells must be molded in advance, the core and shell assemblies must be hand or machine assembled and carefully placed in the mold cavity itself to prevent separation.

In the injection molding of a cover over a core or a core and inner layers retractable pins are usually employed. U.S. Pat. No. 5,147,657 issued Sep. 15, 1992 to Giza discloses a typical retractable pin mold. Retractable pins extend into the mold cavity to support the core as a resinous cover material is injected around the core. The pins, however, must be withdrawn from the heated cover material when it is fluid enough to fill in the pin holes, yet solid enough to support the core. This timing is critical and the process has several drawbacks. The retractable pins are prone to wear and breakage, and are costly to make. The mold itself requires expensive and complicated gates. The timing is difficult to achieve. And, the gating and retractable pins produce numerous surface blemishes on the ball that must be removed in subsequent manufacturing processes.

As in all molding operations, when the golf ball is removed from the hemispherical molds subsequent to the molding operation, it will have molding flash, and possibly other projecting surface imperfections thereon. The molding flash will be located at the fused circular junction of the cover blanks and the parting line of the hemispherical molds. The molding flash will therefore be on a great circle of the spherical golf ball, and that great circle is sometimes referred to in the golf ball art as the "equator" of the golf ball.

The molding flash and possible other projecting surface imperfections, needs to be removed and this is normally accomplished by a grinding, or other trimming operation. Due to the need for grinding, the molding operation must be accomplished in such a manner that the molding flash is located solely on the surface of the golf ball and does not extend into any of the dimples. In other words, a grinding operation may have difficulty reaching into the dimples of the golf ball to remove the molding flash without ruining the golf ball cover.

Therefore, the prior art hemispherical molds are fabricated so that the protrusions formed therein are set back from the circular rims, or mouths of their cavities. The result is that the equator of a molded golf ball is devoid of dimples and the molding flash is located solely on the smooth surface provided at the equator of the golf ball.

In addition to facilitating the grinding-off of molding flash, the protrusions formed in the cavities of the hemispherical molds are set back from the circular mouths of the molds to facilitate removal of the molded golf ball from the mold cavity after completion of the molding operation. If projections were formed at the circular mouths of the molds, they would extend into dimples formed at the equator of the golf ball, and pulling the molded golf ball from the mold cavity in directions perpendicular to the plane of the equator would be difficult, if not impossible.

As is well known, the dimple pattern of a golf ball is a critical factor insofar as the flight characteristics of the ball are concerned. The dimples determine the lift and flight stability of the golf ball. When a golf ball is struck properly, it will spin about a horizontal axis and the air friction and air currents produced by the dimples of the spinning ball will act on the ball and thus determine the lift and flight stability thereof.

In order for a golf ball to achieve optimum flight stability, its dimples must be disposed symmetrically relative to a plane that is perpendicular to its horizontal axis of rotation. Any deviation from such symmetry will result in unequal air friction and air currents acting on the ball thus causing it to deviate from the intended flight path.

In that prior art golf balls are manufactured with a smooth surface along an equator of the ball, the only possible symmetrical arrangement of the dimple patterns that can be provided on these balls is relative to the equator. In other words, the dimple arrays on the hemispherical portions on opposite sides of the equator can be symmetrically arranged with respect to each other. If such symmetry is achieved during manufacturing of a prior art golf ball, the dimple arrays will, of course, be symmetrical relative to the equator. The dimple pattern cannot possibly be symmetrical relative to any other great circle on the spherical surface of the prior art golf balls in that the smooth surface of the equator will interrupt and thus destroy the symmetry.

U.S. Pat. No. 5,798,071 issued to Boehm on Aug. 25, 1998 discloses a process to improve upon the typical injection and compression molding methods. Boehm manufactures a golf ball by injection molding a single piece golf ball preform that replaces the core and two hemispherical shell assemblies. The preform is then compression molded to create the finished golf ball. Using a two mold system, Boehm does not create a cover wherein dimples may be placed upon the equator.

Some U.S. Patents that seek to place dimples upon the equator of the ball include U.S. Pat. Nos. 6,200,232, 6,123,534 and 5,688,193 to Kasashima et al., U.S. Pat. No. 5,840,351 to Inoue et al., and U.S. Pat. No. 4,653,758 to Solheim. All of these patents utilize a two plate mold, and must make provision for the handling of excess flash.

Therefore, a need exists for a new and improved golf ball, with a method and molds for making same, which overcome some of the problems and shortcomings of the prior art.

SUMMARY OF THE INVENTION

In accordance with the present invention, a new and improved golf ball is disclosed which is fabricated by a method that includes the use of specifically configured molds so that the golf ball is formed without a smooth surface lying on a great circle, or equator. By eliminating the need for a smooth surface equator, the dimple pattern on the golf ball of the present invention need not be interrupted by the equator.

The golf ball of the present invention is not fabricated in the same basic manner as the herein before described prior art techniques. A pre-molded sphere of a similar size and weight of the finished golf ball, is placed into special molds. One embodiment of the invention uses two pairs of mold sections to form the dimpled ball. One pair of mold sections have inserts defining the dimple configuration of the ball that is less than hemispherical in size, and the mold sections are positioned vertically on diametrically opposed sides of the pre-molded sphere. Another pair of circular precut mold sections, also having inserts defining the dimple configuration of the ball, are positioned horizontally on diametrically opposed sides of the pre-molded sphere. Under the influence of the relatively high temperatures and pressures applied during the molding operation, the four mold sections fuse the pre-molded sphere into a golf ball comprising a unitary one-piece cover having dimples on the conventional equator and generating relatively negligible parting lines that are offset of the equator. Because of the pre-molded sphere being of relatively the same size and weight of the finished golf ball, flashing is held to a minimum, and the resulting parting lines lack a visually conspicuous parting line.

In that the smooth surface equator of the prior art has been eliminated in the manner discussed above, the dimple pattern on the golf ball of the present invention can be arranged in an uninterrupted manner.

Therefore, the golf ball of the present invention with a dimple pattern arranged in that manner will significantly increase the chances of achieving flight stability in comparison to prior art golf balls.

An embodiment of the invention utilizes a three plate mold to form a golf ball with dual parting lines, both being offset from the "equator". The embodiment, as in all embodiments of the invention, utilizes a pre-molded sphere of similar weight and size as the finished golf ball. The three plates are positioned vertically to each other and the first parting line is spaced from a first pole of the sphere by a first distance and the second parting line is spaced from an opposite pole by a second distance, which is less than the first distance. The first distance being between about 30 to 49 percent of the length of the equator. The second distance being between about 3 to 20 percent of the length of the equator. All three plates have inserts defining the dimple pattern of the golf ball with dimples being located on the equator of the ball.

An embodiment of the invention utilizes a four-plate mold to mold a pattern of dimples on the cover of the ball, wherein four visually inconspicuous parting lines are produced on the ball and dimples may be placed on the equator of the ball.

The invention allows for the manufacturing of a golf ball having a cover that has been liquid-cast, a cover that is made from a thermoplastic material, or a cover made from a partially cured thermoset material.

The foregoing and other objects of the present invention, as well as the invention itself, may be more fully understood from the following description.

BRIEF DESCRIPTION OF THE DRAWINGS

FIG. 4 is an elevational view of a golf ball having four parting lines.

FIG. 5 is an exploded pictorial view of the four-section mold, with the top mold not shown for clarity and the inserts not shown.

FIG. 6 is a cross-sectional elevated view of the four-section mold of FIG. 1.

DETAILED DESCRIPTION OF THE PREFERRED EMBODIMENTS

As discussed above, a typical prior art golf ball has its outer layer or cover applied by either compression molding or by injection molding. Both methods may be used to produce a pre-molded sphere that is of a size and weight similar to the net size and weight of a finished golf ball.

Figure 1:
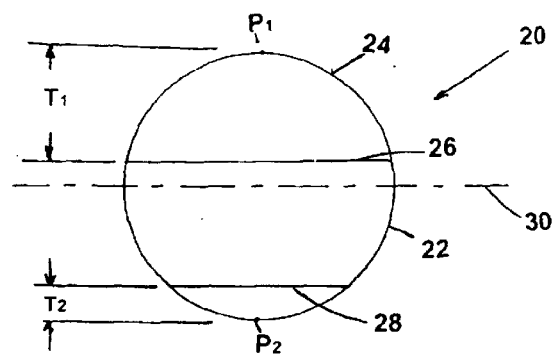
FIG. 1 is a symmetrical elevational view of a golf ball having dual parting lines.
Figure 2:
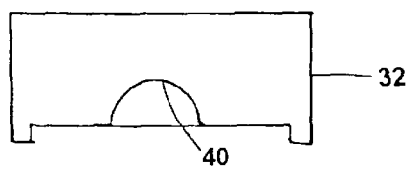
FIG. 2 is an expanded elevational view of the three-inserts of a the present invention mold for making the ball depicted in FIG. 1.
Figure 2:
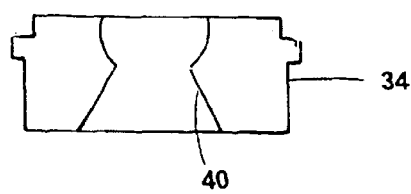
Figure 2:
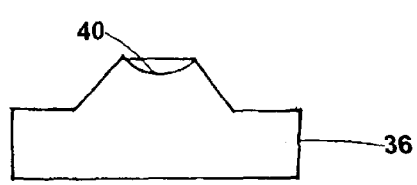
Figure 3:
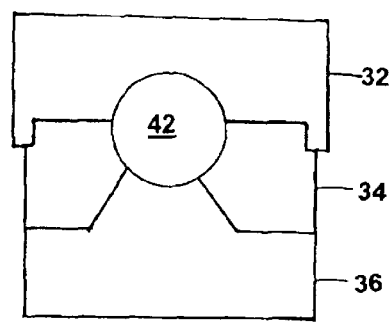
FIG. 3 is a cross-sectional elevated view of the three-inserts in contiguous engagement to define a spherical cavity for receiving a pre-molded sphere.

Referring to FIGS. 1 to 3, wherein an improved golf ball of the present invention is shown, with the golf ball being indicated by the reference numeral 20. A pre-molded sphere 22 (which may include a core, core layers, and/or intermediate layers, and at least one cover layer), having a pair of parting lines, an upper parting line 26 and a lower parting line 28, is described on FIGS. 1–3, with the location of the traditional equator indicated by 30. The upper parting line 26 is spaced from the first pole P1 by a first distance T1 and the lower parting line 28 is spaced from the second pole P2 by a second distance T2. The second distance T2 being less than the first distance T1. Preferably, the first distance is between about 30 to 49 percent of the length of the diameter of the core 22 and more preferably about 45 percent. Preferably, the second distance T2 is between about 3 to 20 percent of the length of the core diameter and more preferably about 10 percent.

Referring to FIGS. 2 and 3, there are illustrated three mold inserts, an upper insert 32, a middle insert 34 and a lower insert 36. Each mold insert can be manufactured with a high population of dimple-forming projections (not shown) that are distributed, preferably uniformly, on spherical cavity surfaces 40 of each insert 32, 34 and 36. The inserts 32, 34 and 36, are in contiguous engagement with each other and removably mated along parting lines 26 and 28 to define a spherical cavity 42 for housing the pre-molded sphere 22. The golf ball pre-molded sphere 22 is of a net size and weight similar to the finished golf ball 20 and may be compression molded at a predetermined pressure, temperature and time. A cover 24 that is inherent to the golf ball 20 used herein may be comprised of thermoplastic resins or the like that are commonly used as golf ball covers. FIG. 3 shows the inserts 32, 34, and 36 all merged in position to compress the pre-molded sphere 22. In actual practice the inserts would each be housed in a mold plate. The housing mold is not herein shown for clarity.

The thus molded golf ball 20 according to the invention is a so-called seamless golf ball that may have dimples located at the equator 30. The process may be used for molding dimple arrangements for one-piece golf balls as well as two-piece, multi-piece golf balls having at least three components or layers, and wound golf balls.

In prior art molding operations, the golf balls would have an excess amount of molding flash upon being removed from the molds and/or fully fill the mold cavity. This is due to the necessity of providing excess cover material to remove unwanted air bubbles from the mold. The molding flash is located on the smooth surface that is coextensive with fused junctions (parting lines). Usually, except for some "seamless" style golf balls, the seam is the equator of the ball. The molding flash must be removed from the golf ball subsequent to its removal from the mold and this is usually accomplished by a grinding operation. If dimples appear on the equator portion of the ball, then it is very possible that the effort to remove the flash by the grinding process could also damage the ball. Because in the present invention, the pre-molded sphere 22 is of a size and shape of the golf ball itself, the amount of flashing is thereby reduced substantially, resulting in parting lines that are almost negligible.

In another embodiment of the invention that is illustrated in FIGS. 4–6, a golf ball 50 is depicted having a at least four parting lines, a top parting line 52, a bottom parting line 54, and two vertical extending parting lines 56. This design would require four mold plates, a top plate 60, a bottom plate 62, and lateral plates 64 for their manufacture. For clarity, the mold shown in FIG. 5 is shown without the top plate 60. As in the above description the golf ball pre-molded sphere 22 is of a size and weight of the finished golf ball 50 and thereby flashing is kept to a minimum which will result in negligible parting lines appearing on the cover of the ball. For ease of drawing, it is appreciated that as in the above embodiment each of the mold plates 60, 62, and 64 would of course include inserts containing dimple projections. While no effort has been taken to describe the means for operating the molds, it is appreciated that that is well within the knowledge of the manufacturing community.

The pre-molded spheres can be fully cured or they may be partially cured as in the case of thermoset materials, which are then fully cured in the compression process.

It will be understood that the claims are intended to cover all changes and modifications of the preferred embodiment of the invention herein chosen for the purpose of illustration which do not constitute a departure from the spirit and scope of the invention.

I claim:

1. A golf ball manufactured by compressing dimples in an arrangement about a pre-molded sphere, the ball comprising:

the pre-molded sphere of a net weight and size similar to the ball, the sphere having an equator;

a plurality of parting lines offset from the equator; and dimples located on the equator.

2. The golf ball according to claim 1, wherein the parting lines comprise dual parting lines, the lines comprising of:

an upper parting line and a lower parting line;

the upper parting line being spaced from a first pole by a first distance; and the lower parting line being spaced from an opposite pole by a second distance which is less than the first distance.

3. The golf ball according to claim 2, wherein the first distance is between about 30 to 49 percent of the diameter of the pre-molded sphere.

4. The golf ball according to claim 2, wherein the second distance is between about 3 to 20 percent of the diameter of the pre-molded sphere.

5. The golf ball according to claim 1, wherein the parting lines comprise four parting lines, a top parting line, a bottom parting line and a pair of vertical parting lines, each vertical parting line extending between the top and bottom parting lines.

6. The golf ball mold according to claim 5, wherein two of the parting lines are continuous and two of the parting lines are partial.

7. The golf ball according to claim 6, wherein the partial parting lines are on an equator.

* * * * *